United States Patent [19]

Tsukida et al.

[11] Patent Number: 5,400,499
[45] Date of Patent: Mar. 28, 1995

[54] INTERNAL BUSHING REMOVAL TOOL

[75] Inventors: Robert S. Tsukida; Douglas K. Ethridge; Frank Ortega; Vincent R. Cantacessi, all of San Jose, Calif.

[73] Assignee: General Electric Company, San Jose, Calif.

[21] Appl. No.: 201,492

[22] Filed: Feb. 24, 1994

[51] Int. Cl.⁶ .............................................. G21C 19/00
[52] U.S. Cl. ........................................ 29/723; 29/275; 294/97; 376/463
[58] Field of Search .................. 376/260, 463; 29/275, 29/282, 426.5, 723; 294/95, 97, 99.2; 81/3.05, 3.7, 323, 463

[56] References Cited

U.S. PATENT DOCUMENTS

| | | | |
|---|---|---|---|
| 1,341,132 | 5/1920 | Johnson | 29/275 |
| 1,342,852 | 6/1920 | Lindenmuth | 29/275 |
| 1,964,468 | 6/1934 | Irvine | 29/275 |
| 2,924,005 | 2/1960 | Wilson | 29/282 |

*Primary Examiner*—Daniel D. Wasil
*Attorney, Agent, or Firm*—J. E. McGinness

[57] ABSTRACT

A tool for removal of the internal bushings from a piston coupling of a CRD. The tool incorporates a spring-loaded and hardened collet supported on one end of a ram. The collet has a pair of arms with shoulders or projections which latch inside the internal bushing ring to be removed. The tool is inserted into the piston coupling from either end, depending on which internal bushing is to be removed. The tool is inserted until the latching shoulders or projections snap behind the radially inwardly projecting internal bushing, with the contact surfaces of the shoulders or projections in contact with a radial end surface of the bushing. The bushing can then be dislodged, from the inside out, by impacting the other end of the ram with a hammer.

5 Claims, 8 Drawing Sheets

INTERNAL BUSHING REMOVAL TOOL

FIELD OF THE INVENTION

This invention relates generally to maintenance of a control rod drive of a boiling water reactor. In particular, the invention relates to tools for dismantling or assembling a control rod drive during a maintenance operation.

BACKGROUND OF THE INVENTION

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in 12 the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled before a CRD or control rod may be removed from the reactor.

When installed in the reactor, the CRD is wholly contained in housing 10. The CRD flange 6 contains an insert port 66, a withdraw port 70 and an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, reactor pressure is admitted to the two-way check valve from the annular space between the CRD and a thermal sleeve (not shown) through passages in the CRD flange, called scram vessel ports. The check valve directs reactor pressure or external hydraulic pressure to the underside of drive piston 24.

Referring to FIG. 2, the CRD further comprises an inner cylinder 57 and an outer tube 56, which form an annulus through which water is applied to a collet piston 29b (see FIG. 1) to unlock index tube 26. The internal diameter of inner cylinder 57 is honed to provide the surface required for expanding seals 65 on the drive piston 24.

Welded pipes 80 and 81, installed in the CRD housing, port water to the insert port 66 and the withdraw port 70 respectively. A port 69 below outer tube 56 connects to withdraw port 70 in CRD flange 6 so that water is applied through the annulus to collet piston 29b when a withdraw signal is given.

The CRD is secured to the CRD housing flange 10a by eight mounting bolts (not shown). A pressure-tight seal is effected between the mated flanges by O-ring gaskets (not shown) mounted in a spacer 7 secured to the CRD flange face.

Insert port 66 contains a ball check valve which consists of check-valve ball 20, ball retainer 21, and retainer O-ring 22. This valve directs HCU accumulator pressure or reactor pressure to the underside of drive piston 24 during scram operation. Port 66 is connected internally to the annulus and the bottom of drive piston 24 and serves as the inlet for water during normal insertion or scram. Water enters this port for a brief period in response to a withdraw signal to move the index tube 26 upward so that collet fingers 29a (see FIG. 1) are cammed out. Following this brief unlocking period, water from below drive piston 24 is discharged through port 66 and through the under-piston hydraulic line for the duration of the withdraw signal.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism comprises collet fingers 29a, collet piston 29b and collet spring 31. This mechanism is the means by which index tube 26 is locked to hold the control rod at a selected position.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against a guide cap (not shown). When the withdraw signal ceases, the spring pressure forces the collet downward so that fingers 29a slip off the guide cap. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of bands 25 with tab locks.

There are 25 notches machined into the wall of index tube 26, all but one of which are locking notches 55 spaced at 6-inch intervals. The uppermost surfaces of these notches engage collet fingers 29a, providing 24 increments at which a control rod may be positioned and preventing inadvertent withdrawal of the rod from the core. The lower surfaces of the locking notches slope gradually so that the collet fingers cam outward for control rod insertion.

Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively.

The magnet housing, which comprises the lower end of drive piston 24, contains a ring magnet 67 which actuates the switches of the position indicator probe (not shown) to provide remote electrical signals indicating control rod position.

The piston tube assembly forms the innermost cylindrical wall of the CRD. It is a welded unit consisting of piston tube 15 and a position indicator tube 61. The position indicator tube 61 is a pressure-containing part which forms a drywell housing for a position indicator probe 12a (see FIG. 2). Piston tube 15 provides for the porting of water to or from the upper end of the piston head portion of drive piston 24 during rod movement.

The tube section 15a and head section 15b of piston tube 15 provide space for position indicator tube 61, which is welded to the inner diameter of the threaded end of head section 15b and extends upward through the length of tube section 15a, terminating in a watertight cap near the upper end of the tube section. Piston tube 15 is secured by a nut 16 at the lower end of the CRD. Two horizontal ports are provided in the head section 15b, 180° apart, to transmit water between the withdraw porting in the CRD flange and the annulus between indicator tube 61 and tube section 15a of piston tube 15 for application to the top of drive piston 24. Three O-ring seals 18 are installed around head section 15b. Two seal the bottom of the CRD against water leakage and one seals the drive piston 24 under-piston pressure from the drive piston over-piston pressure.

The position indicator probe 12a, which is slidably inserted into indicator tube 61, transmits electrical signals to provide remote indications of control rod position and CRD operating temperature. Probe 12a is welded to a plate 12b, which is in turn bolted to housing 12. Housing 12 is secured to the CRD ring flange 17 by screws 13. A cable clamp (not shown), located at the bottom of a receptacle 14, secures a connecting electrical cable to receptacle 14. Ring flange 17 is in turn secured to the CRD housing by screws 9. Thus, probe 12a, housing 12 and the cable clamp (with the cables passing therethrough) can be removed as a unit.

In order to perform maintenance on a CRD, the CRD must be removed from its CRD housing. After the CRD and control rod are uncoupled, the CRD is removed from the CRD housing and then disassembled for the purpose of performing required maintenance on the respective CRD components. The CRD is placed in a horizontal position on a work table and disassembled. After drive piston 24 has been disengaged from the index tube and removed from the piston tube, it is disassembled into its component parts, i.e., magnet housing 24a, seal cups 24b, piston coupling 24c and piston head 24d (see FIG. 3).

After piston coupling 24c has been disengaged from magnet housing 24a and piston head 24d, the internal bushings 63 must be removed from the piston coupling. These bushings are graphitar rings which sit in annular recesses located at opposing ends of the piston coupling bore. These rings become encrusted with crud during reactor operation. As a result, the internal bushings become stuck inside the piston coupling and are difficult to remove using conventional tools such as chisels and screwdrivers. Moreover, during such removal, the piston coupling may be damaged.

SUMMARY OF THE INVENTION

The present invention is a tool for removal of the internal bushings from a piston coupling of a CRD without causing damage to the piston coupling. The tool comprises a spring-loaded and hardened collet supported on one end of a ram. The collet has a pair of arms with shoulders or projections which latch inside the internal bushing ring to be removed. The tool is inserted into the piston coupling from either end, depending on which internal bushing is to be removed. The tool is inserted until the latching shoulders or projections snap behind the radially inwardly projecting internal bushing, with the contact surfaces of the shoulders or projections in contact with a radial end surface of the bushing. The bushing can then be dislodged, from the inside out, by impacting the other end of the ram with a hammer or mallet. The tool in accordance with the invention reduces the time required for CRD disassembly and consequently reduces the radiation exposure of maintenance personnel.

DETAILED DESCRIPTION OF THE PREFERRED EMBODIMENTS

Figure 1:
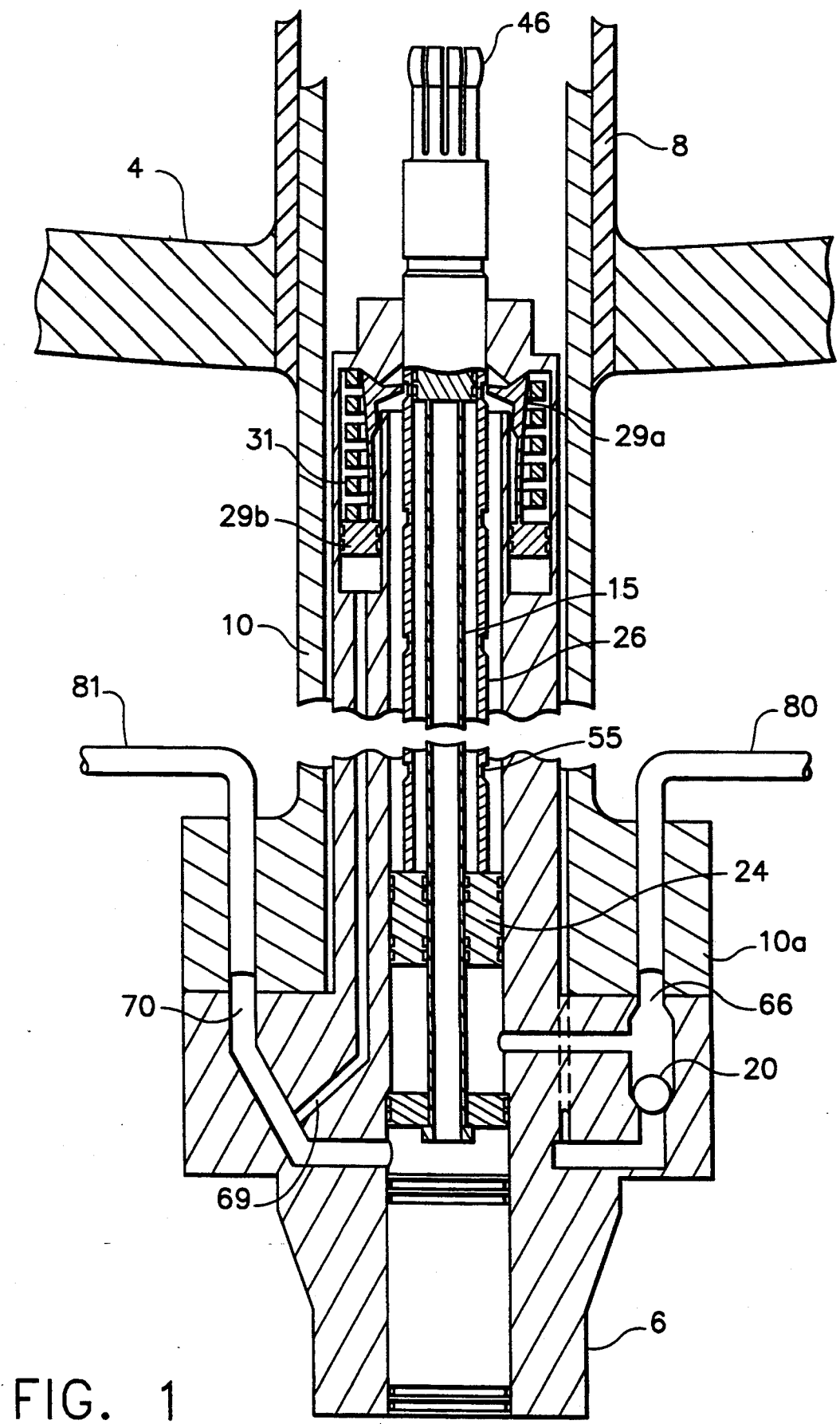
FIG. 1 is a sectional schematic of a conventional control rod drive installed in a BWR.
Figure 2:
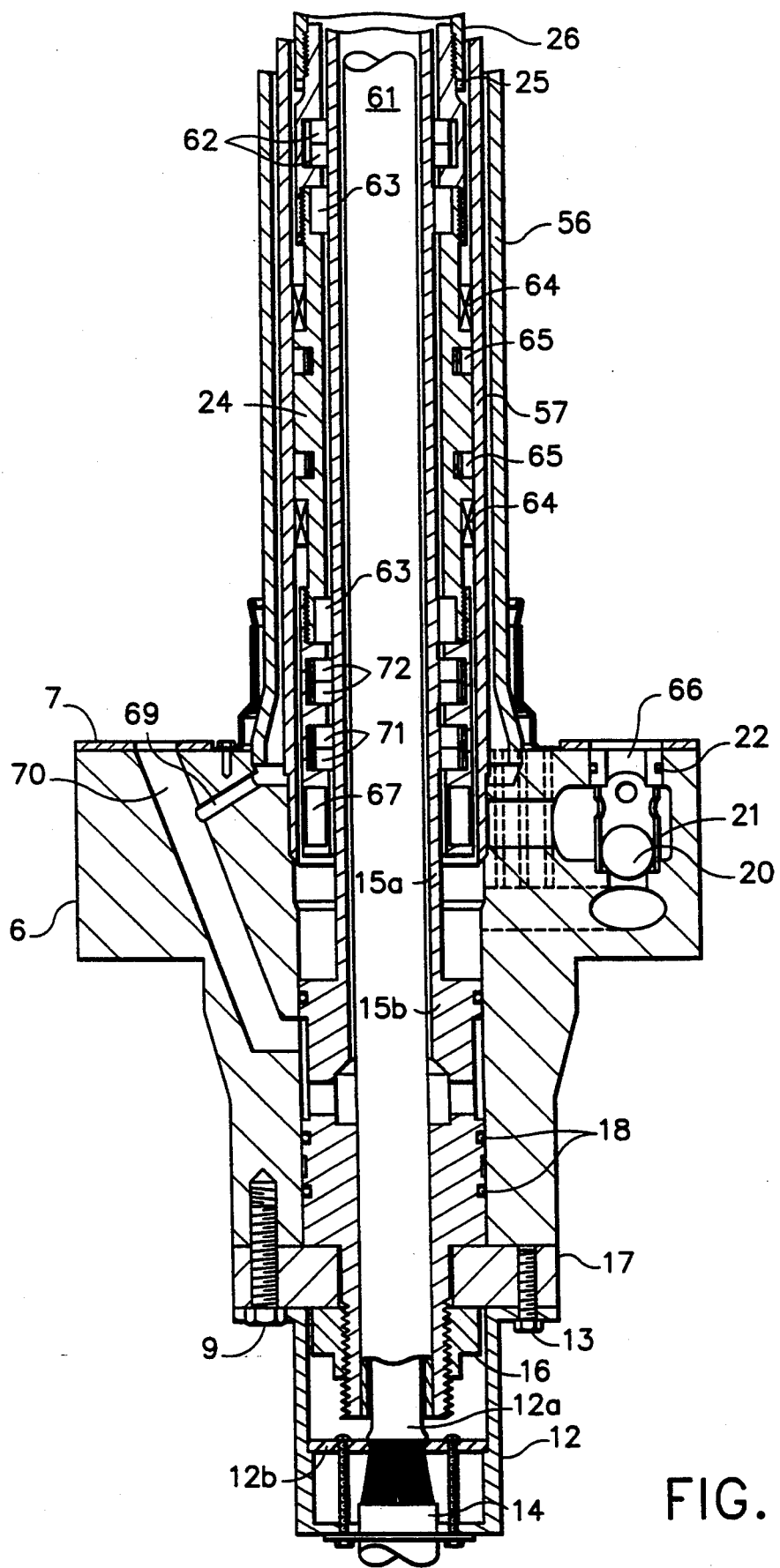
FIG. 2 is a sectional view of the lower portion of a conventional control rod drive.
Figure 3:
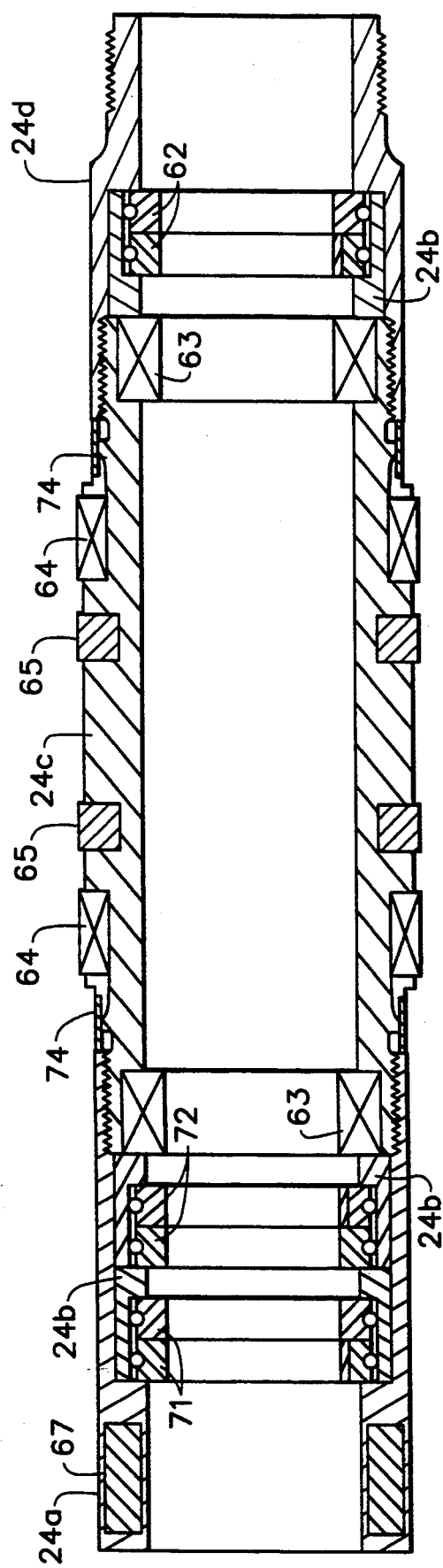
FIG. 3 is a sectional view of an assembled CRD drive piston.
Figure 4A:
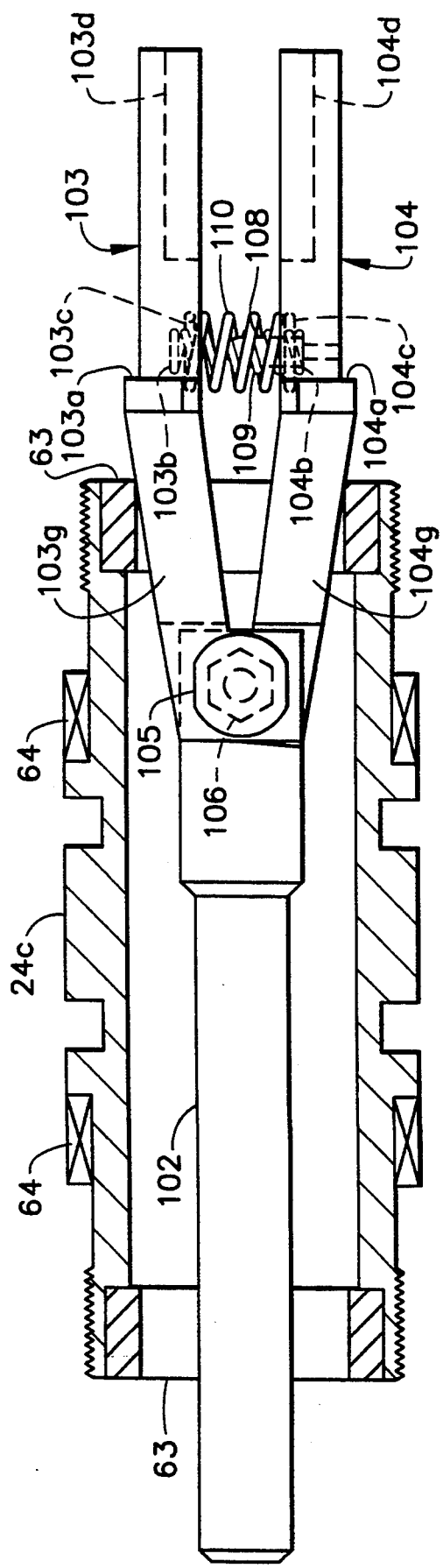
FIGS. 4A–4C are views of an internal bushing removal tool in accordance with a preferred embodiment of the invention before, during and after internal bushing removal from the piston coupling.
Figure 4B:
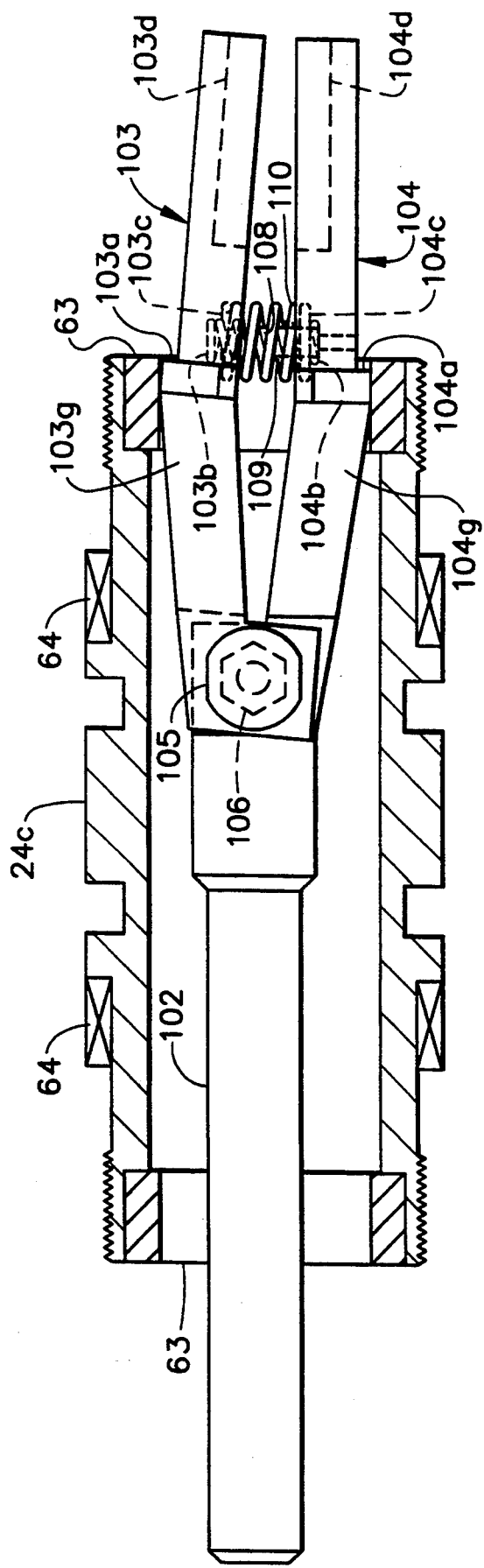
Figure 6:
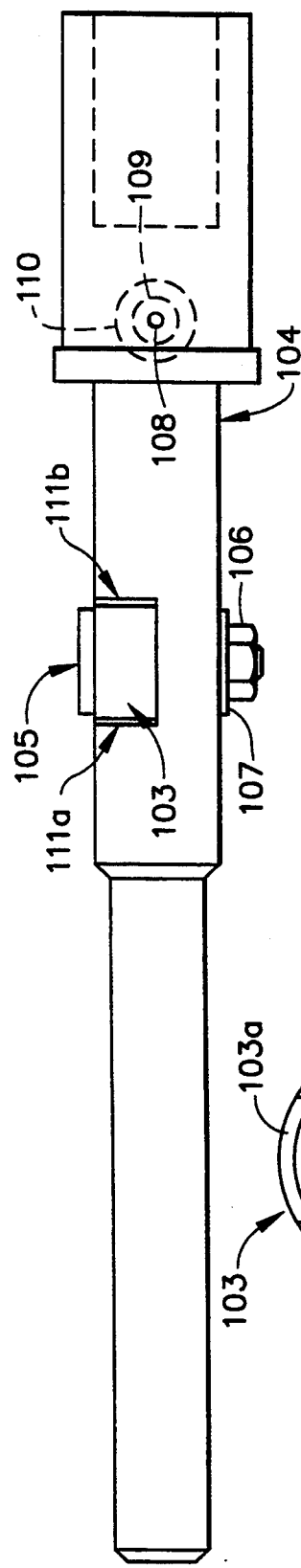
FIGS. 6 and 7 are side and end views respectively of the internal bushing removal tool of FIGS. 4A–4C.
Figure 5A:
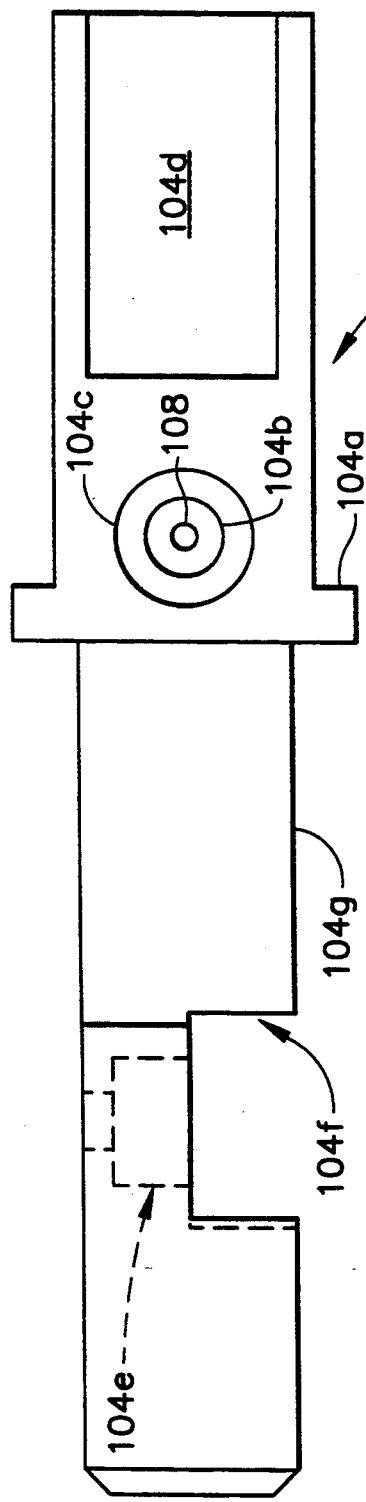
FIGS. 5A–5C are respectively a top view of the ram, a side view of the swivel pin, and a side view of the swivel arm of the internal bushing removal tool of FIGS. 4A–4C.
Figure 5B:
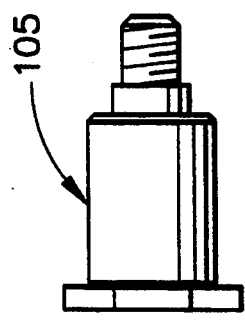
Figure 5C:
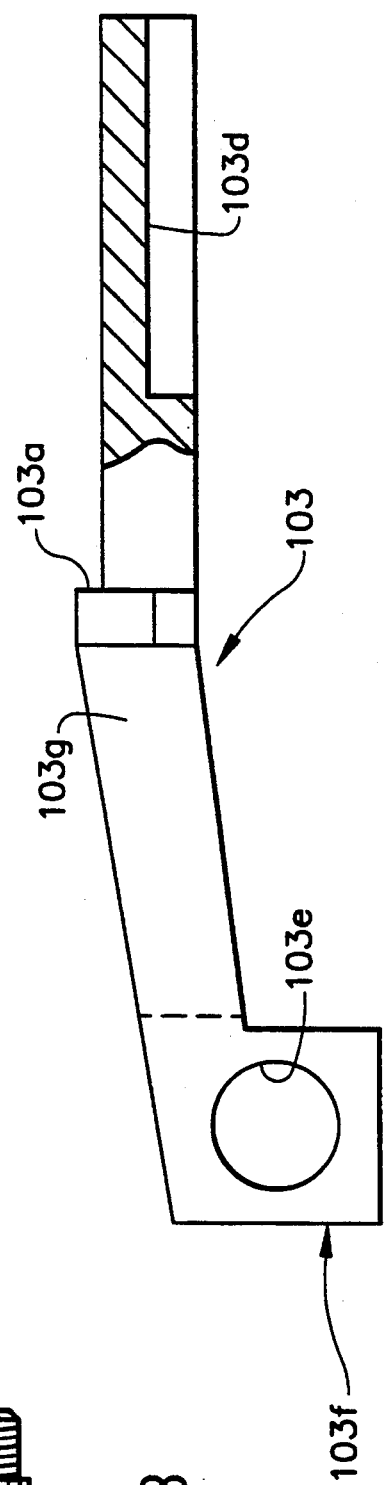

Referring to FIG. 4A, the internal bushing removal tool in accordance with the preferred embodiment is shown during insertion into the piston coupling 24c. The tool comprises a ram arm 104 having a bore 104e (see FIG. 5A) for receiving the shaft of a swivel pin 105 (see FIG. 5B). A swivel arm 103 (see FIG. 5C) has a swivel block 103f with a bore 103e for receiving swivel pin 105. Block 103f resides inside a cavity 104f in ram arm 104. Swivel arm 103 is held in place on swivel pin 105 (with two machined wrench flats) by a hex nut 106 with a lock washer 107 therebetween (see FIG. 6). The swivel arm and ram arm have opposing surfaces separated by gap 111a and 111b that allow a small angle of rotation of swivel arm 103 about the axis of swivel pin 105 and relative to ram arm 104.

The arms 103 and 104 have opposing seats 103b, 104b and 103c, 104c for receiving respective ends of concentrically arranged inner (109) and outer (110) springs (see FIG. 4A). A guide pin 108 mounted on ram arm 104 projects inside inner spring 109 along its axis to guide the windings during compression of the spring, thereby restraining non-axial flexing of the spring. The inner and outer springs are compression springs which urge the ram and swivel arms apart, until full open stop is achieved by contact of adjacent surfaces of 103f and 104f.

Figure 7:
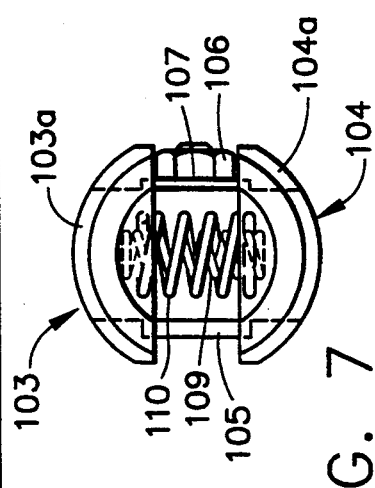

The ram arm 104 has an arcuate shoulder with a radial arcuate contact surface 104a (see FIG. 7). Similarly, the swivel arm 103 has an arcuate shoulder with a radial arcuate contact surface 103a. Inclined rigid members 103g and 104g connect the contact surfaces to the bored members that mount on swivel pin 105.

Figure 4C:
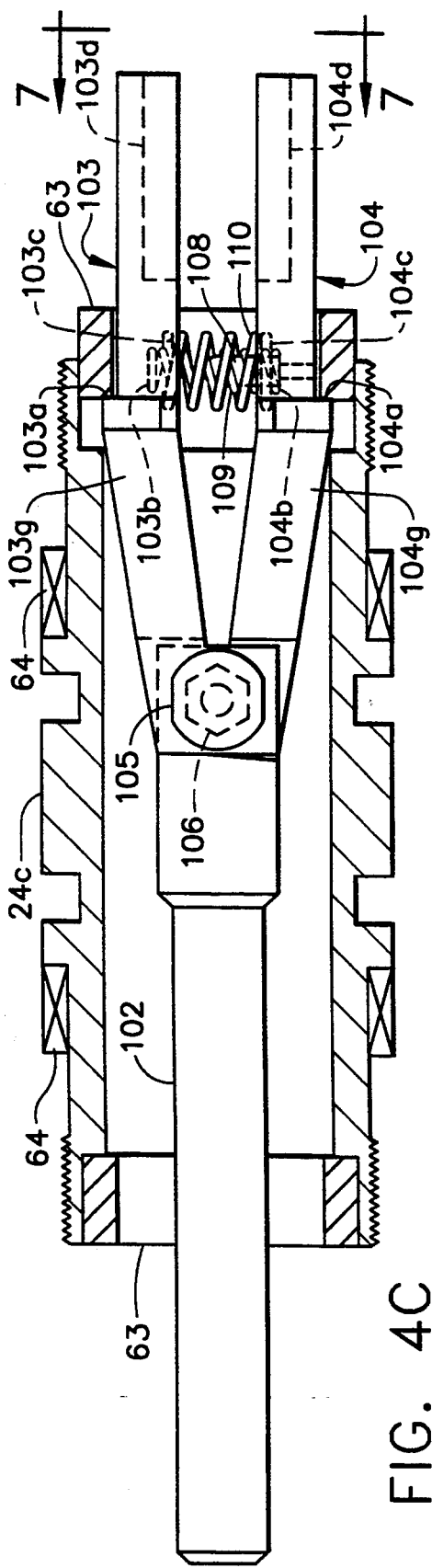

At the position shown in FIG. 4A, the inclined portions 103g and 104g bear against the near inner peripheral edge of the internal bushing 63 to be removed. In a conventional CRD, the bore of each internal bushing 63 has a radius less than the radius of the bore of piston coupling 24c. As the removal tool is forced leftward from that position, the inner peripheral edge of the bushing will exert radially inwardly directed forces which overcome the spring forces urging ram and swivel arms 103, 104 apart. As a result, the contact surfaces 103a and 104a travel through the bore and past the far inner peripheral edge of the bushing. When the contact surfaces clear the far inner peripheral edge of bushing 63, the arms are urged apart by springs 109 and 110. The outer peripheral edge of each contact surface is pushed radially outward to a locus beyond the radius of the bore of bushing 63 (as shown in FIG. 4C), thereby latching the removal tool to the internal bushing. In the latched position, contact surface 103a abuts the internal bushing along a first arc and contact surface 104a abuts the internal bushing along a second arc diametrally opposed to the first arc. In these positions, the arcuate contact surfaces will bear against diametrically opposed portions of the end face of the internal bushing.

Thus, swivel arm 103, ram arm 104, swivel pin 105, inner spring 109 and outer spring 110 form a spring-loaded collet having a pair of arc-shaped contact surfaces which can be latched behind the far inner peripheral edge of the internal bushing to be removed. These contact surfaces are then forced against the bushing end face to push bushing 63 out of the corresponding recess in piston coupling 24c.

The respective ends of arms 103 and 104 are provided with cylindrical concavities 103d and 104d, respectively, to reduce the mass of the arms. These ends serve as handles by which the arms can be manually pressed together during the insertion step of FIG. 4A.

Figure 8:
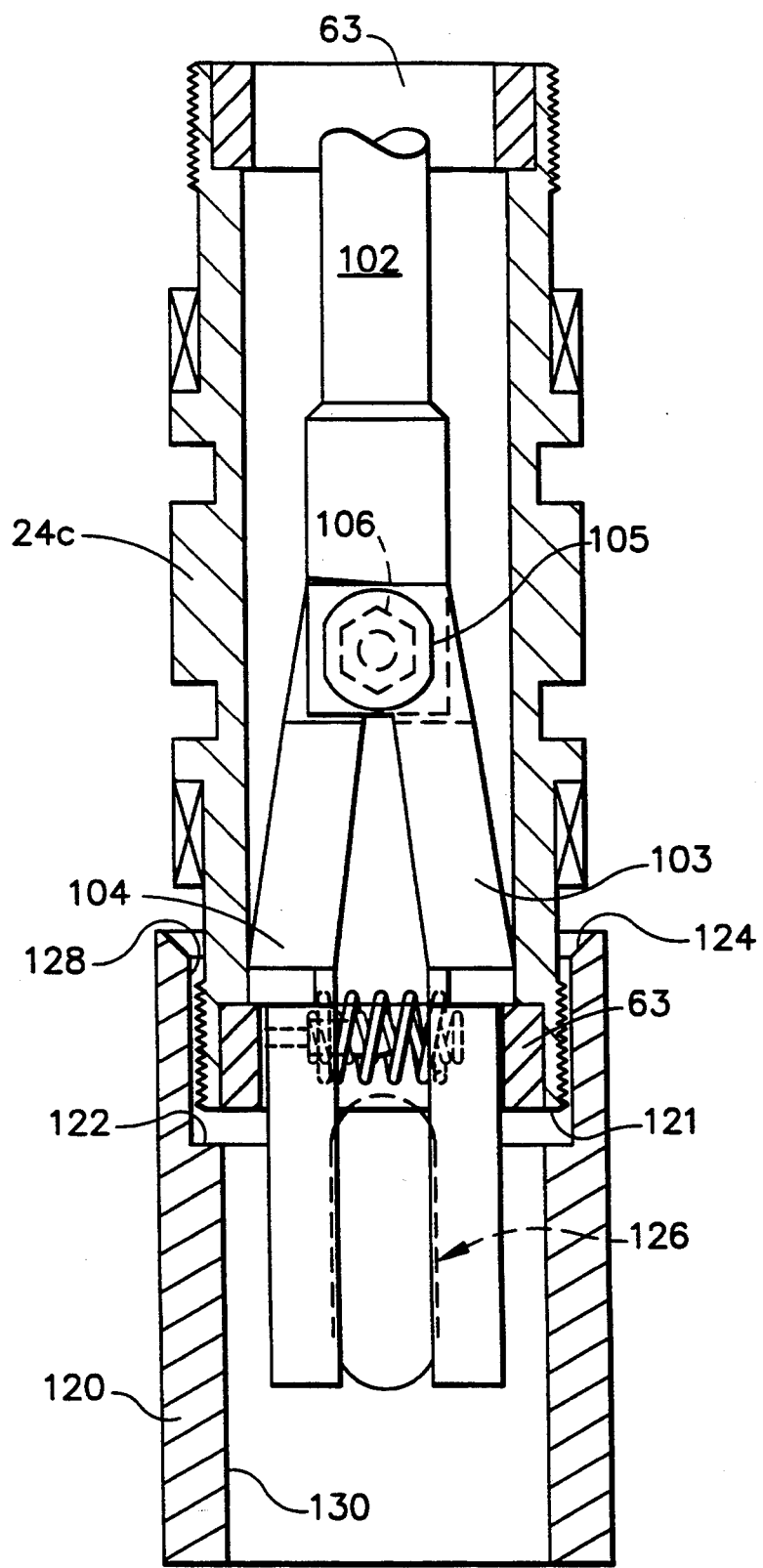
FIG. 8 is a view of the tool during internal bushing removal.

The removal tool in accordance with the invention further comprises a ram 102 which screws into an end portion of ram arm 104. Ram 102 is preferably a solid cylinder having a flat end. During removal of the internal bushings, ram 102 and piston coupling 24c are held in horizontal or vertical positions by means of a stand 120 (see FIG. 8). Stand 120 is a cylindrical tube with a chamfered inlet 124 and an annular shoulder 122 which separates bores 128 and 130 of different diameter. Bore 128 receives the end of the piston coupling 24c, with the annular end face 121 of piston coupling 24c sitting on and supported by shoulder 122. A hammer or mallet is impacted against the flat end of ram 102 to drive the tool along the longitudinal axis and out of the piston coupling 24c. The force of the impact is transferred via contact surfaces 103a and 104a to the opposing radial end face of the internal bushing, thereby pushing the bushing axially out of the annular recess in which it is seated (see FIG. 4C), without damage to the piston coupling. A window 126 allows the operator to view the progressive downward displacement of bushing 63. The diameter of bore 130 is such that the removed bushing 63 passes through.

The preferred embodiment of the internal bushing removal tool has been disclosed for the purpose of illustration. Variations and modifications of the disclosed structure which do not depart from the concept of this invention will be readily apparent to mechanical engineers skilled in the art of tooling. All such variations and modifications are intended to be encompassed by the claims set forth hereinafter.

What is claimed is:

1. A tool for removing an internal bushing, comprising:
    a first member having a first arcuate planar contact surface, a first seat and a first circular cylindrical bore;
    a second member having a second arcuate planar contact surface, a second seat and a second circular cylindrical bore, said first and second members being arranged so that said first and second circular cylindrical bores are coaxial;
    a swivel pin having a longitudinal axis and arranged to pass through said first and second circular cylindrical bores, each of said first and second members being pivotable relative to said swivel pin and relative to each other about said longitudinal axis of said swivel pin, said first and second members having a first relative angular position in which said first and second arcuate planar contact surfaces are co-planar and a second relative angular position in which said first and second arcuate planar contact surfaces are closer together than in said first relative angular position;
    means for preventing removal of said swivel pin from said first and second circular cylindrical bores;
    a third member rigidly connected to said second member, said third member being a solid cylinder having a longitudinal axis perpendicular to said longitudinal axis of said swivel pin; and
    a first compression spring having one end seated in said first seat and another end seated in said second seat, said first compression spring urging said first and second members apart in said second relative angular position.

2. The tool as defined in claim 1, further comprises a guide pin mounted on said second member and projecting inside said first compression spring to prevent flexing of said first compression spring.

3. The tool as defined in claim 1, wherein said first and second seats are separated from said axis of rotation by a first longitudinal distance and said first and second arcuate planar contact surfaces are separated from said axis of rotation by a second longitudinal distance less than said first longitudinal distance.

4. The tool as defined in claim 1, wherein said first member has a third seat concentric with said first seat and said second member has a fourth seat concentric with said second seat, further comprising a second compression spring having one end seated in said third seat and another end seated in said fourth seat, said second compression spring encircling said first compression spring.

5. The tool as defined in claim 1, wherein said first member has a first straight portion located between said first arcuate planar contact surface and said first circular cylindrical bore and said second member has a second straight portion located between said second arcuate planar contact surface and said second circular cylindrical bore, said first and second straight portions having first and second camming surfaces respectively, said first and second camming surfaces being separated by an acute angle when said first and second members have said first relative angular position.

* * * * *